(12) United States Patent
Ramachandran (10) Patent No.: US 7,604,165 B2
(45) Date of Patent: Oct. 20, 2009

(54) AUTOMATED BANKING MACHINE PROCESSING SYSTEM AND METHOD

(75) Inventor: Natarajan Ramachandran, Uniontown, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 12/319,194

(22) Filed: Jan. 2, 2009

(65) Prior Publication Data

US 2009/0145962 A1 Jun. 11, 2009

Related U.S. Application Data

(63) Continuation of application No. 10/100,851, filed on Mar. 18, 2002, now Pat. No. 7,472,824.

(60) Provisional application No. 60/276,974, filed on Mar. 19, 2001.

(51) Int. Cl.
G07F 19/00 (2006.01)
(52) U.S. Cl. .................. 235/379; 235/376; 235/382
(58) Field of Classification Search .......... 235/376, 235/379, 380, 382; 902/8; 705/35, 43
See application file for complete search history.

(56) References Cited

U.S. PATENT DOCUMENTS

| | | | |
|---|---|---|---|
| 5,386,104 | A | 1/1995 | Sime |
| 5,764,789 | A | 6/1998 | Pare |
| 5,850,075 | A | 12/1998 | Brannan |
| 6,305,603 | B1 | 10/2001 | Grunbok |
| 6,308,887 | B1 | 10/2001 | Korman |
| 6,360,303 | B1 | 3/2002 | Wisler |
| 6,381,346 | B1 | 4/2002 | Eraslan |
| 6,484,936 | B1 * | 11/2002 | Nicoll et al. ............. 235/379 |
| 6,695,204 | B1 * | 2/2004 | Stinson et al. ............. 235/379 |
| 6,944,318 | B1 * | 9/2005 | Takata et al. ............. 382/115 |
| 6,975,220 | B1 | 12/2005 | Foodman |
| 7,015,945 | B1 | 3/2006 | Sullivan |
| 2002/0194138 | A1 | 12/2002 | Dominguez |
| 2004/0015450 | A1 | 1/2004 | Zingher |

FOREIGN PATENT DOCUMENTS

EP 0953946 A2 11/1999

(Continued)

OTHER PUBLICATIONS

Sullivan, W.T. et al: "A New Major SETI Project Based on Project Serendip Data and 100,000 Personal Computers" 1997, URL: http://ai.mit.edu/projects/aires/papers/distributed/setiathome.pdf.

(Continued)

*Primary Examiner*—Seung H Lee
(74) *Attorney, Agent, or Firm*—Ralph E. Jocke; Walker & Jocke (57) ABSTRACT

A system includes a plurality of automated banking machines that each include a card reader and operate to carry out financial transactions. A server computer in operative connection with the plurality of automated banking machines receives processing jobs. The server operates to distribute a plurality of tasks among a plurality of automated banking machines. Each automated banking machine is operative to perform transaction functions such as the dispensing of cash from a cash dispenser.

14 Claims, 4 Drawing Sheets

| FOREIGN PATENT DOCUMENTS | | |
|---|---|---|
| WO | 97/42764 A1 | 11/1997 |
| WO | 98/11714 A2 | 3/1998 |
| WO | 98/25229 A1 | 6/1998 |
| WO | 99/08238 A1 | 2/1999 |
| WO | 00/28492 A1 | 5/2000 |
| WO | 00/36812 A1 | 6/2000 |
| WO | 00/79360 A2 | 12/2000 |

OTHER PUBLICATIONS

Korpela, E. et al.: "Seti@Home-Massively Distributed Computing for SETI", Computing in Science and Engineering, IEEE vol. 3 No. 1, Jan. 2001, pp. 78-83.

* cited by examiner

| ATM Model | Duration of Time To Complete Test Task (Hrs) | Normalizing Factor |
|---|---|---|
| A | 2.5 | 0.2 |
| B | 1.0 | 0.5 |
| C | 0.5 | 1.0 |
| D | 2.0 | 0.25 |
| E | 4.0 | 0.125 |

FIG. 4

| TaskID | ATMID | ATM Model | Actual Duration of Time To Complete Task (Hrs) | Normalized Duration of Time (Hrs) |
|---|---|---|---|---|
| 1 | 101 | A | 1.7 | 0.34 |
| 2 | 102 | C | 0.7 | 0.7 |
| 3 | 103 | D | 2.2 | 0.55 |
| 4 | 104 | C | 0.6 | 0.55 |
| 5 | 105 | C | 0.3 | 0.03 |
| 6 | 106 | E | 4.0 | 0.5 |
| 7 | 107 | B | 1.1 | 0.55 |
| | | Totals: | 10.6 | 3.54 |

AUTOMATED BANKING MACHINE PROCESSING SYSTEM AND METHOD

CROSS REFERENCE TO RELATED APPLICATIONS

This application is a continuation of U.S. application Ser. No. 10/100,851 filed Mar. 18, 2002. Ser. No. 10/100,851 claims benefit of U.S. Provisional Application Ser. No. 60/276,974 filed Mar. 19, 2001. The disclosures of each of these applications is incorporated herein by reference.

TECHNICAL FIELD

This invention relates to automated banking machines that operate responsive to data bearing records such as user cards and which may be classified in U.S. Class 235, Subclass 379.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or travelers checks. For purposes of this disclosure an ATM, an automated banking machine, or an automated transaction machine shall encompass any device which carries out transactions including transfers of value.

Many ATMs include modern processing systems with fast processors, large amounts of memory, and large storage devices. Such processing systems enable ATMs to display high resolution graphical user interfaces which may include audio visual presentations and other processor intensive applications. Although short interruptions in the operation of an ATM may occur when the ATM is being serviced, in general ATMs are available for consumer use 24 hours a day, 7 days a week. Unfortunately consumers do not generally use ATMs continuously 24 hours a day, 7 days a week. Even the most heavily used ATMs experience a significant number of idle periods of non-consumer use. Although small amounts of processing power may be used for maintaining the ATMs in an available state for future consumer uses, generally during such idle periods the processing systems of ATMs remain significantly underutilized. Consequently there exists a need for a system and method of providing productive uses for unused processing power in ATMs.

ATMs typically generate income from transaction fees. Unfortunately during off peak hours such as the early morning hours of a day, relatively few consumer transactions may be performed resulting in relatively small amounts of income being generated. As a result there further exists a need for a system and method of generating additional income from ATMs during off peak hours.

DISCLOSURE OF INVENTION

It is an object of an exemplary form of the present invention to provide an automated banking machine at which a user may conduct transactions.

It is a further object of an exemplary form of the present invention to provide an automated banking machine that is more productive during periods of non-consumer use.

It is a further object of an exemplary form of the present invention to provide an automated banking machine that is operative to generate income during periods of non-consumer use.

It is a further object of an exemplary form of the present invention to provide a system and method which provides additional uses for unused processing power in ATMs. Further objects of exemplary forms of the present invention will be made apparent in the following Best Modes for Carrying Out Invention and the appended claims.

The foregoing objects may be accomplished in an exemplary embodiment by an automated banking machine or ATM that includes at least one output device such as a display screen, and at least one input device such as a touch screen, function keys, keypad, a keyboard, card reader or other type of input device. The machine may further include devices such as a cash dispenser mechanism for sheets of currency, a receipt printer mechanism, a depository mechanism and other transaction function devices that are used by the machine in carrying out transactions.

The ATM includes at least one computer processor. The computer processor is in operative connection with the output devices and the input devices, as well as with the cash dispenser mechanism, receipt printer mechanism and other physical transaction function devices in the ATM. The computer processor includes software programs that are executable therein.

In an exemplary embodiment, the software programs include a processing client application. The processing client application is operative to communicate with a coordination server application located remotely from the ATM. In an exemplary embodiment the coordination server application is operative within a server computer processor of a financial transaction processing system, which in this example may include a host banking system, or another networked server computing system in operative connection with the ATM.

The exemplary embodiment of the processing client application is operative to cause the computer processor of the ATM to perform tasks received by the processing client application from the coordination server application. The exemplary embodiment of the processing client application may be operative to prevent the degradation of an ATM's performance while a consumer is using the ATM, by limiting the processing of a received task, to idle periods when a consumer is not using the ATM and/or when the ATM is not performing transaction functions.

In the exemplary embodiment the coordination server application of the server computer receives processing jobs from one or more job submitting entities. Such processing jobs may be divided into a plurality of tasks by the coordination server application and distributed among a plurality of different ATMs. The jobs may be received from a computer system or network address associated with the one or more job submitting entities. The jobs may also be manually inputted into the coordination server application and/or retrieved from a portable storage medium. In other exemplary embodiments, job submitting entities may include users which may submit a processing job to the coordination server application through operation of one of the ATMs in communication with the coordination server application.

The exemplary embodiment of the coordination server application may be operative to communicate with a plurality of ATMs connected through either a private financial network or a public network such as the Internet. Responsive to the processing ability of each ATM and the corresponding speed of each network connection to each ATM, the exemplary coordination server application may be operative to selectively divide one or more processing jobs among a plurality of different ATMs. As each ATM completes a received portion of the job or a task, the ATMs may be operative to forward the results of the tasks to the coordination server application. The coordination server application assembles the results returned by the ATMs and continuously returns additional or other tasks to the ATMs to be processed during idle periods.

In the exemplary embodiment, jobs may be received by the coordination server application from individuals, businesses, universities, governmental agencies, or other entities which require large amounts of processing resources to process complex problems or other computer definable calculations or functions.

For example, a processing job may include the rendering of motion picture images for an animated movie. Movies are often comprised of tens of thousands of individual images. The exemplary embodiment of the coordination server application may be operative to send programming instructions for rendering one or more different images of the movie to a plurality of different ATMs. During idle periods, the exemplary ATM may be operative to perform ray tracing calculations or other image rendering functions responsive to the programs which define each image. When an image has been completely rendered, an ATM may be operative to return a corresponding image file to the coordination server application. The ATM may then continue processing additional images or may perform other tasks received by the coordination server application. This process may continue until all of the images in the movie have been rendered.

In this described exemplary embodiment, the coordination server application may be operative to assemble the completed image files and forward them to the entity which submitted the processing job. In one exemplary embodiment, the coordination server application may aggregate all or a portion of the tasks completed by the ATMs into a group before forwarding the group of the completed tasks to the job submitting entity. In other embodiments, the coordination server application may periodically or continuously return the results of individual tasks to the job submitting entity as they are individually completed by the ATMs. The coordination server application may be further operative to calculate the total amount of processing time consumed by the ATMs to process the processing job and based on this amount, calculate the amount of fees to bill the entity which submitted the processing job.

BEST MODES FOR CARRYING OUT INVENTION

Figure 1:
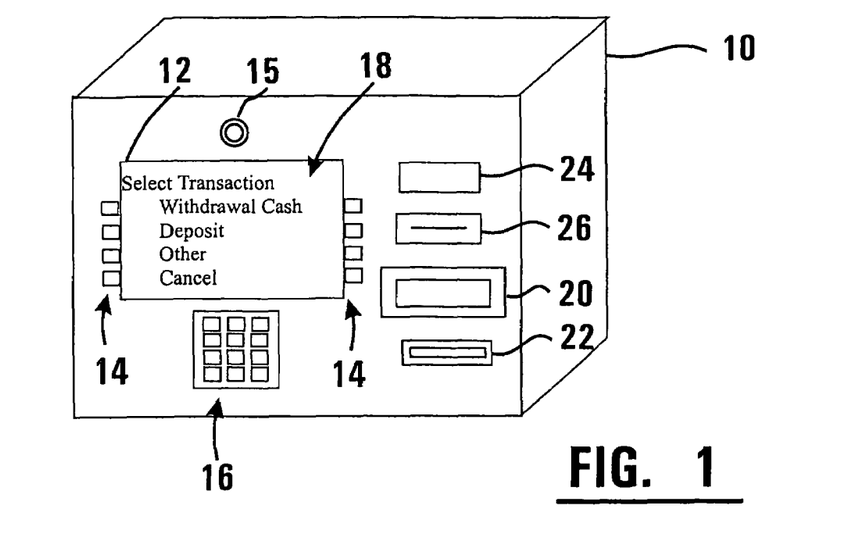
FIG. 1 is a perspective view of an exemplary embodiment of an ATM that is operative to process tasks associated with a processing job.

Referring now to the drawings and particularly to FIG. 1, there is shown therein a perspective view of an exemplary automated banking machine or ATM 10. The exemplary ATM 10 includes at least one output device such as a display device 12. The output device 12 is operative to provide a consumer with a user interface 18 that includes a plurality of screens or other outputs including selectable options for operating the machine. The exemplary embodiment may further include other types of output devices such as speakers, or other types of devices that are capable of outputting visual, audible, or other sensory perceptible information.

The exemplary embodiment of the automated banking machine 10 includes a plurality of input devices such as function keys 14 and a keypad 16 as well as a card reader 26. The exemplary embodiment of the ATM 10 may further include or utilize other types of input devices, such as a touch screen, microphone, or any other device that is operative to provide the ATM with inputs representative of user instructions or information. The machine may also include one or more biometric reader devices such as a fingerprint scanner, an iris scanner, facial recognition device, hand scanner, or any other biometric reading device which may be used to read a biometric input that can be used to identify a user.

The exemplary ATM 10 further includes a plurality of transaction function devices which may include for example a sheet or cash dispenser 20, depository 22, a receipt printer 24 and other devices.

Figure 2:
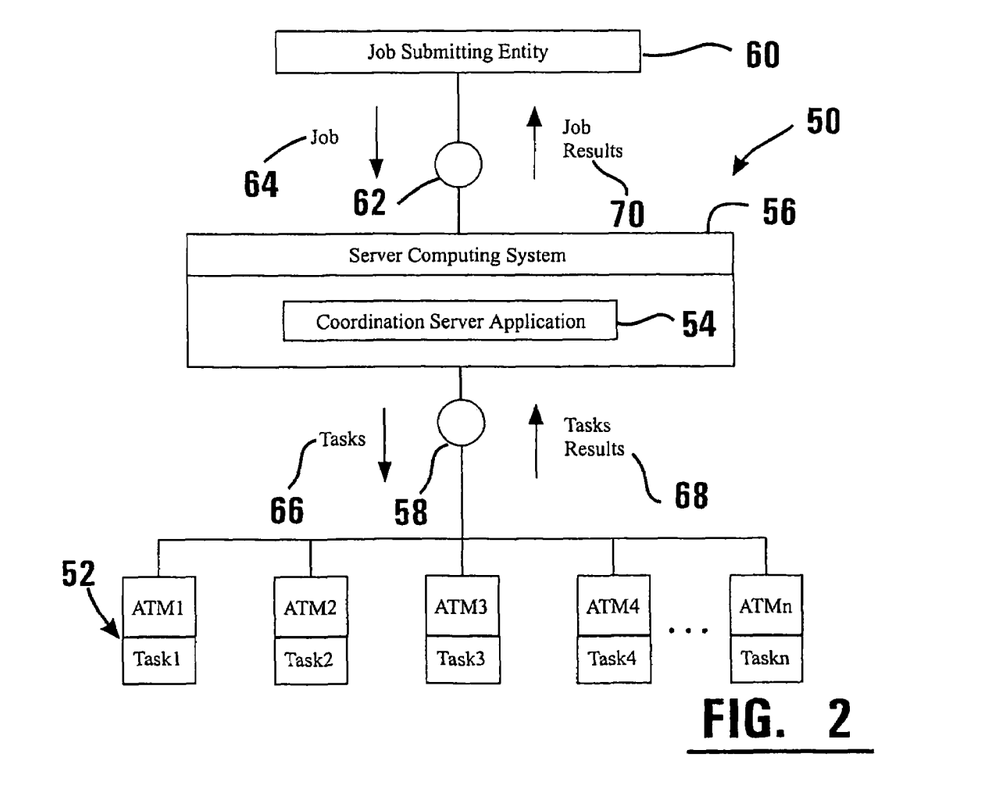
FIG. 2 is a schematic view of an exemplary embodiment of an ATM processing system.

FIG. 2 shows a schematic view of an exemplary embodiment of an ATM processing system 50. The system may include a plurality of ATMs 52. These ATMs may include all or a portion of the features and devices described with reference to the ATM 10 of FIG. 1. The plurality of ATMs 52 may be in operative connection with at least one server computing system 56 through a public or private network connection 58. In one exemplary embodiment the network connection 58 and the server computing system 56 correspond to portions of a private financial transaction processing system such as a host banking system. However, in alternative exemplary embodiments, the network connection 58 may correspond to a public network such as the Internet and the server computing system 56 may include a server in operative connection with the Internet.

The exemplary server computing system 56 may also be in operative connection with the computer systems of one or more job submitting entities 60 through a network connection 62. The network connection 62 may also include a private network and/or a public network such as the Internet. The computer systems of the exemplary job submitting entities 60 may include computers and/or other devices of individuals, companies, governmental agencies, universities or any other entity which is operative to submit computer definable processing jobs to the server computing system 56.

The exemplary server computing system 56 includes a coordination server application 54 operative therein. The coordination server application 54 may be operative to communicate with each of the ATMs 52 and with one or more job submitting entities 60. In one exemplary embodiment, the coordination server application 54 may be operative to receive at least one processing job 64 from the computer system of the job submitting entity 60. The coordination server application 54 may be further operative to divide the processing job into a plurality of tasks 66 which are distributed by the coordination server application to all or a subset of the ATMs 52. Examples of processing jobs may include ray tracing calculations, database mining, cryptographic processes, unencrypting data, stock market analysis, DNA sequencing calculations, digital signal processing, finite elemental analysis and modeling, sub-atomic particle analysis, chemical property and reaction calculations, analysis of images, analysis of biometric data, analysis of facial image data, analysis of data from monetary instruments, analysis of image data from check, analysis of data corresponding to cursive signatures or other handwriting, analysis of image data from currency, or any other computer processing calculation, analyzation, function or program which can be subdivided into tasks for parallel processing by a plurality of ATMs.

The exemplary embodiments of the ATMs 52 may be operative to process the received tasks and return the results of the tasks 68 to the coordination server application 54. The exemplary embodiment of the coordination server application 54 may be operative to assemble the task results 68 and return the results of the processing job 70 to the job submitting entity 60.

A processing job may be sent to the coordination server application from the job submitting entity as a complete group of individual tasks which are divided among the ATMs after the job has been received. In addition the processing jobs may be sent to the coordination server application from the job submitting entity as a continuous or periodic stream of tasks. The coordination server application may then begin dividing the tasks among the plurality of ATMs 52 before all of the tasks associated with the job have been received by the coordination server application from the job submitting entity.

Likewise, the job results 70 being returned to the job submitting entity 60 from the coordination server application 54 may include all or a portion of the task results 68 received from the ATMs. Thus the coordination server may wait until all of the task results 68 expected have been returned from the ATMs 54 before the job results 70 are assembled and returned to the job submitting entity 60 as one completed job, or portions of the job results 70 may be periodically or continuously streamed from the coordination server application to the job submitting entity as task results 68 are received from the ATMs 54.

Figure 3:
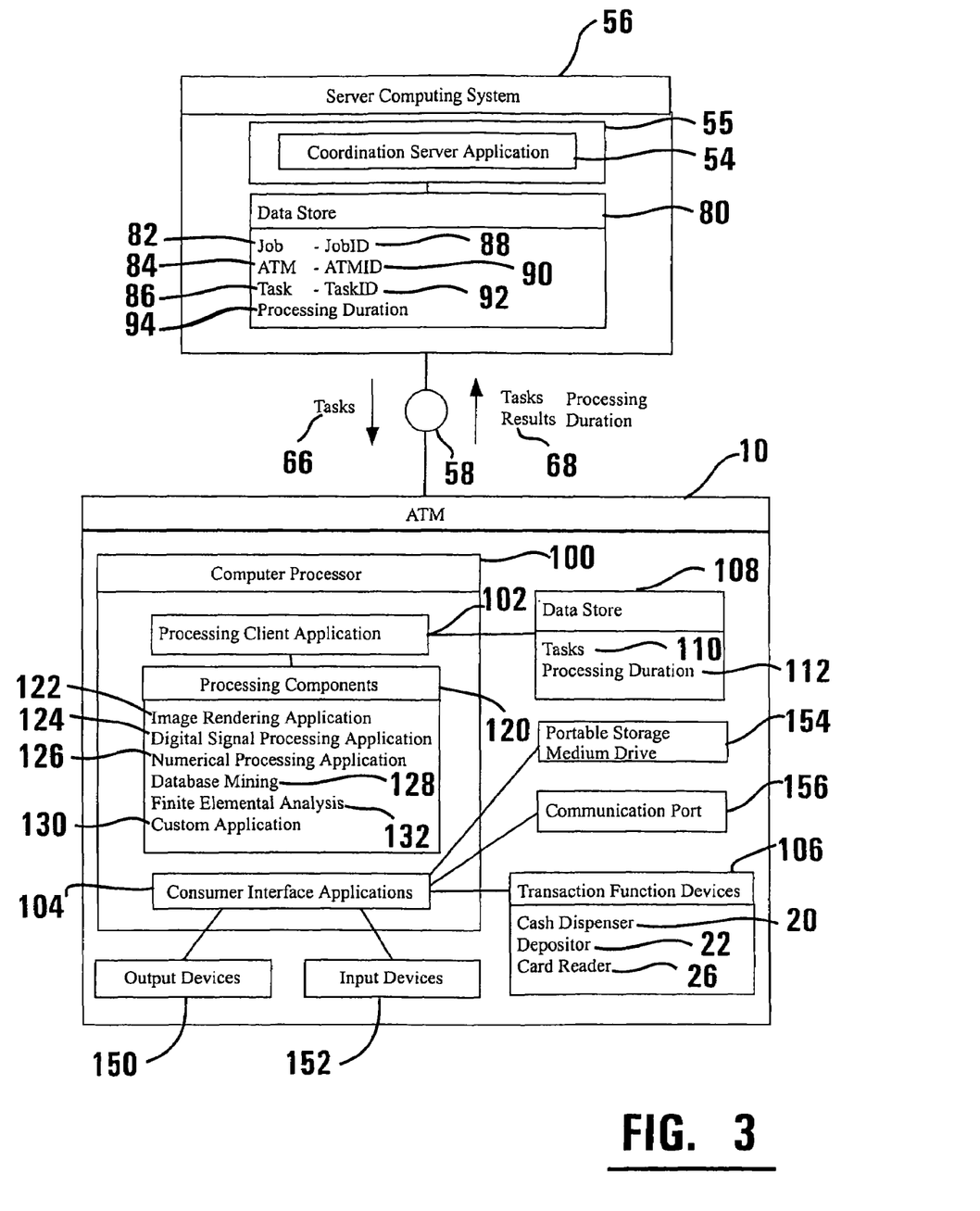
FIG. 3 is a schematic view representative of exemplary embodiments of a coordination server application and a processing client.

FIG. 3 shows a schematic view of the exemplary server computing system 56 and an exemplary ATM 10. The server computing system 56 includes at least one server computer processor 55. As discussed previously, the server computing system 56 includes a coordination server application 54. The coordination server application 54 may be operative in the at least one server computer processor 55. In addition the exemplary server computing system 56 includes at least one data store 80 in operative connection with the server computer processor 55. The coordination server application 54 may be operative to cause the server computer processor 55 to store and retrieve data in the data store 80.

The coordination server application 54 may be operative to store job data 82 in the data store 80 which describes each processing job received by the job submitting entities. Further the coordination server application 54 may be operative to store in the data store 80 task data 86 in association with the job data 82 which describes tasks which comprise the processing job. In addition the coordination server application may be operative to store in the data store 80, ATM data 84 in association with the task data 86 which identifies which ATM has been sent the task to process. In one exemplary embodiment, each processing job may be associated with a JobID number 88, each task may be associated with a TaskID number 92, and each ATM may be associated with an ATMID number 90.

As shown in FIG. 3, each ATM 10 includes at least one computer processor 100. The computer processor 100 may be in operative connection with at least one output device 150 such as a display device. The computer processor may also be in operative connection with at least one input device 152 such as a key pad, function keys, or touch screen. In the exemplary embodiment, the ATM 10 further includes a processing client application 102 that may be operative in the computer processor 100. The exemplary processing client application 102 may be operative to communicate with the coordination server application 54 for purposes of receiving tasks 66 and returning the task results 68. In addition the processing client application 102 may be operative to manage the processing of tasks by the computer processor 100 of the ATM 10.

In one exemplary embodiment the processing client application 102 may be operative to communicate with consumer interface applications 104 which are operative in the computer processor 100. Such consumer interface applications 104 are responsible for enabling the ATM 10 to interact with consumers and perform transaction functions. The consumer interface applications 104 are in operative connection with a plurality of transaction function devices 106 such as the previously described cash dispenser 20, depositor 22, and card reader 26.

In the exemplary embodiment, the processing client application 102 may be responsive to the consumer interface applications 104 to control when tasks are processed by the computer processor 100. For example, when the ATM 10 is being used by a consumer, the exemplary processing client application 102 may be operative to detect this condition through communication with the consumer interface applications 104 and as a result stop, pause, or slow the amount of processing resources of the computer processor that are devoted to processing the task 66. When the ATM is generally idle, the exemplary processing client application 102 may be operative to detect this condition through communication with the consumer interface applications 104 and as a result start, un-pause, or increase processing resources of the computer processor 100 that are devoted to processing the task.

In an exemplary embodiment, the computer processor 100 may be in operative connection with a data store 108. The exemplary processing client application 102 may be operative to store in data store 108 task information 110 which describes tasks received by the coordination server application 54. As tasks are processed by the computer processor 100, the exemplary client application 102 may be further operative to store in data store 108 processing time duration information 112 in association with the task information 110. The duration information 112 corresponds to the amount of processing time the computer processor 100 has spent actively processing a task. For example, when the exemplary ATM is idle for 30 minutes of an hour, and that entire 30 minutes is devoted to processing a task, the duration information 112 would associate 30 minutes of processing time with the task information 110 corresponding to the task being processed by the ATM.

In the exemplary embodiment, a task may require further processing applications which correspond to the type of task being processed. For example a task corresponding to a digital signal processing calculation may be associated with data which describes a signal and data which describes calculations to be performed on the signal. However, to process the signal according to the calculations, the exemplary ATM may require task specific processing components 120 such as server applets, functions libraries, subroutines, software objects, classes, scripts, DLLs, Java applets, Java beans, COM objects, ActiveXs, .Net objects, CORBA objects, or any other software component which can be used by the processing client application 102 to process the task. In an exemplary embodiment, the processing client application 102 may be responsive to the task data and other task instructions to cause one or more of a plurality of processing components 120 to process a task. Each of the exemplary processing components are responsive to the processing client application 102 to start and pause the processing of tasks so that the tasks are generally only processed when the ATM is idle.

Examples of processing components 120 include image rendering applications 122, digital signal processing applications 124, numerical processing applications 126, database mining applications 128, and finite elemental analysis applications 132. In an exemplary embodiment, the processing components 120 may be pre-installed in a data store of the ATM. However, in alternative exemplary embodiments, received tasks from the coordination server application may include one or more processing components that are operative to process the task. For example, a digital signal processing task may include both signal data to be processed and a custom processing component or application 130 that may be operative to execute in the computer processor responsive to the processing client application 102. The exemplary custom processing component 130 may be operative to process the signal data or other data associated with the task or related tasks which are received by the ATM 10 from the coordination server application 54.

In the exemplary embodiment the processing components 120 may include object code or libraries which are operative to execute in the computer processor 100 natively. In further exemplary embodiments, the processing components 130 may include interpreted code such as Java® applets or Java beans which are operative to run within another application such as a Java Virtual Machine. In other exemplary embodiments, the processing components may be comprised of a common intermediate language (CIL) such as a .Net application object which may be just-in-time (JIT) compiled at the ATM prior to executing in the computer processor of the ATM. In further exemplary embodiments, the tasks may include processing components which are self contained and are not operative to process external data. For example, a task to render an individual clip from a movie may be comprised of a processing component 120 that includes compiled code for performing ray tracing calculations which define the image. Any data which describes the locations of objects and light sources for the image, may be encapsulated within the processing component.

To prevent the spread of malicious viruses and worms in ATMs, the exemplary processing components may be digitally signed and be associated with digital certificates. The digital signature and digital certificates may be used by the ATM to validate that the processing components originate from a trusted source of processing components. Also, the ATM may be operative to execute the processing components in a secure runtime environment such as a virtual machine or sandbox. Such a secure runtime environment may include sufficient security to prevent a malicious processing client from accessing transaction functions devices such as a cash dispenser.

In the exemplary embodiment, as tasks are completed, the processing client application 102 may be operative to send the task results 68 to the coordination server application 54 and receive additional tasks for processing by the computer processor 100. The processing client application 102 may be further operative to forward to the coordination server application the processing duration 112 associated with the processing of a task. When all or a portion of the tasks have been completed, the exemplary coordination server application may be operative to forward the job results to the job submitting entity.

In the exemplary embodiment, the coordination server application 54 may be operative to cause fees to be assessed to a job submitting entity for the amount of ATM processing power time used to process a processing job 64. The coordination server application may be operative to calculate a total of the processing durations 94 associated with all of the tasks 86 of a processing job. This total amount of processing time for a processing job may then be billed to the entity submitting the task.

For example, the exemplary system may be accessed by a job submitting entity such as a movie production company to render the individual movie frames of an animated film. In this described embodiment, the processing job corresponds to the rendering of the movie, and the individual tasks correspond to one or more individual frames of the movie. If a hypothetical average processing time for each frame of the movie by ATMs is one hour, then a 90 minute animated film comprised of 162,000 images would require 162,000 ATM hours to render. If the coordination server application is in operative connection with 10,000 ATMs which are idle 75% of the time, the system could render the movie in 21.6 hours (1/0.75*162,000/10,000). The job submitting entity, or in this case the movie production company, could be charged a processing fee based on the total number of ATM hours used to process the job (i.e. the 162,000 ATM hours). In exemplary embodiments such a processing fee may be based on a negotiated price per ATM hour.

In exemplary embodiments the system may charge fees based on a flat rate of monetary value per an amount of processing time used on a processing job. In addition, exemplary embodiments of the system may charge fees based on the number of ATMs devoted to a processing job. For example the fee rate for using 10,000 ATMs on a processing job may be higher or lower then the fee rate for using 100 ATMs on a processing job. Also, the fee rate for using slower model ATMs for a processing job may be different than the fee rate for using faster ATMs on a processing job. In the exemplary embodiment, the coordination server application may further be operative to calculate the fees for processing a job submitted by a job submitting entity.

ATMs being used to process a single job may not all have equivalent processing power. For example older model ATMs may be relatively slow at processing tasks compared to new model ATMs with modern computer processors. If all ATM hours are treated equal, a given job would take more ATM hours to complete using slower ATMs, than faster ATMs. As job submitting entities may not want to pay higher processing fees when portions of a job are processed by slower ATMs, the exemplary coordination server application or other server software with access to the duration data for task results, may be operative to normalize the duration data responsive to the relative processing speed of the ATMs.

For example, if a hypothetical slow ATM is operative to complete a given task in two hours and a hypothetical fast ATM is operative to complete the same given task in half an hour, the exemplary system may be operative to normalize the slower processing duration time data and/or the faster processing duration time data relative to a selected performance baseline. The duration times for slower ATMs would be normalized downward based on the selected performance baseline and duration times for faster ATMs would be normalized upward based on the selected performance baseline. For example, if one hour is selected as a performance baseline for the same given task, duration times for the slower ATMs could be halved and duration times for the faster ATMs could be doubled to produce normalized processing duration times for both types of ATMs. The normalized duration times may then be summed to determine a normalized number of ATM hours to complete the job. The processing fee charged to the processing fee entity may then be based on the total normalized number of ATM hours rather than the total of actual ATM hours to complete the job.

As the relative difference between the processing speed of different models or types of ATM systems may depend on the types of processing tasks, the exemplary system may be operative to sample the different relative processing speeds of different models or types of ATMs using designated sample tasks from the job. For example, if a job is comprised of one million tasks, the exemplary coordination server application may allocate a small subset of test tasks selected from the one million tasks to be given to a subset of all of the ATMs. The subset of ATMs selected may include ATMs that represent the different models or types of ATMs that will be used to process the entire job. The duration times to complete the test tasks for each of the different models or types of ATMs may then be compared to determine coefficients, factors or other normalizing data which may be used to normalize the durations of the task results submitted for similar models or types of ATMs. For example, each individual duration time may be normalized first and then summed to determine a normalized amount of ATM hours to base a processing fee for the job. In other embodiments, the actual duration times of tasks for each model of ATM may be separately totaled for a job. When the job is completed, these separate duration totals for each ATM model may be normalized responsive to the normalizing data for each model of ATM. The normalized duration totals for each type of ATM may then be summed to determine a normalized amount of ATM hours to base a processing fee for the job.

Figure 4:
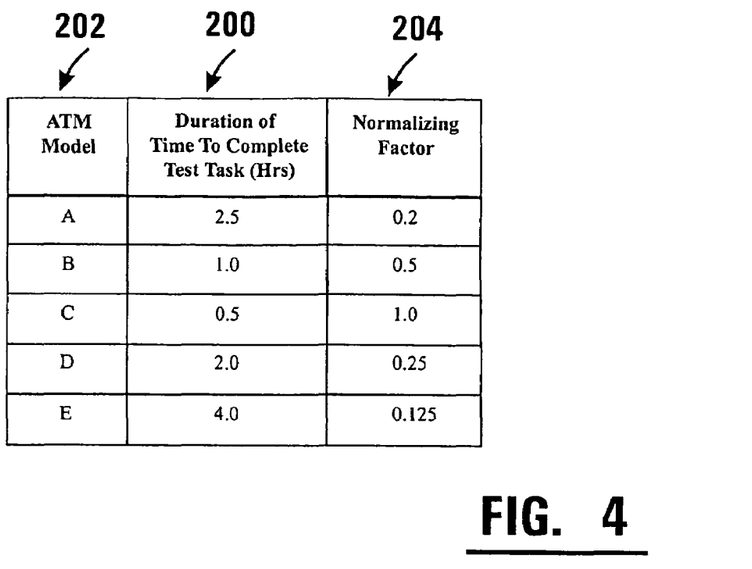
FIG. 4 shows a listing of processing durations to complete a test task by different models of ATMs.
Figure 5:
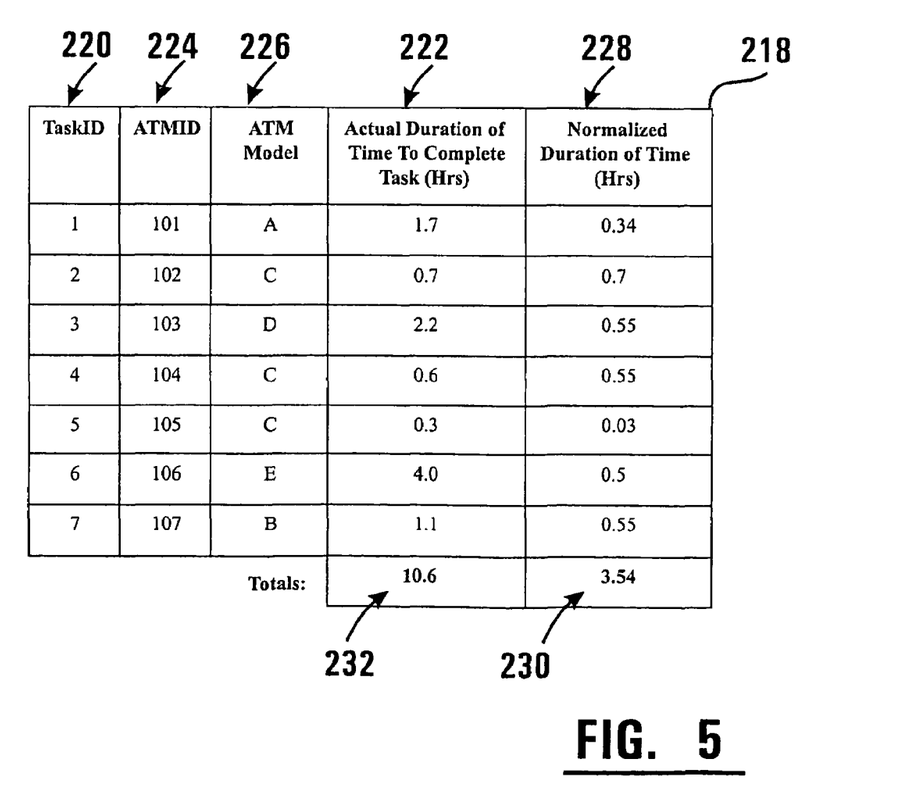
FIG. 5 shows a listing of task results for a processing job for a plurality of different ATMs.

FIGS. 4 and 5 show an example of normalized data for a hypothetical job which may be determined by the coordination server application 54 and stored in the data store 80. As shown in FIG. 5, the hypothetical job is comprised of seven tasks 220. The exemplary coordination server application may be operative to select a subset of the tasks for use as test tasks to determine the relative processing capabilities such as processing speeds for models of ATMs that will be used to process the job. In this example, TaskID 6 is chosen and is communicated to the processing client applications of five different models of ATMs which will be used to process the job. FIG. 4 shows the duration times 200 to complete TaskID 6 for each of the five ATM models (A-E) 202. In this example the normalizing baseline is selected to correspond to a duration equal to the fastest time submitted by the different models of ATMs. In this case the duration time of 0.5 hours for ATM model C is selected for the baseline. However, it is to be understood that the baseline chosen to normalize duration times may be a different slower or faster time duration. For example, with other jobs the baseline may correspond to: the duration time for the slowest ATM (ex. 4 hrs for ATM model E); the average or mean duration time for the different models; or some other selected duration time.

Based on a selected baseline of 0.5 hours, FIG. 4 shows normalizing data such as normalizing factors 204 that the coordination server application may determine responsive to the selected baseline duration and the sample duration time results for the test task. Such normalizing factors may be used by the coordination server application to normalize the duration times returned by ATMs to process the tasks for the job.

FIG. 5 shows an example listing 218 of hypothetical job results for the seven tasks 220 that comprise the job. In this example the coordination server application divided the task among seven different ATMs 224. The listing includes the actual duration times 222 reported by the ATMs 224 to complete their designated task. The listing also includes the corresponding ATM models 226 for the ATMs 224.

In this example, the exemplary coordination server application may be operative to normalize the actual duration times 222 responsive to the normalizing factors 204 determined previously and shown in FIG. 4. In this example the normalized durations 228 are calculated by multiplying the actual duration times 222 by the normalizing factor 204 which corresponds to the matching model of ATM that processed the task. The exemplary coordination server application may sum the normalized durations 228 to determine the normalized number of ATM hours 230 it took to complete the job. Processing fees may then be based on the normalized total of ATM hours 230 to complete the job rather than the actual total of ATM hours 232 to complete the job. Without normalizing the ATM hours, job submitting entities may demand that only the fastest model ATMs (such as ATM model C) be used. By normalizing the processing durations, the slower ATMs (such as ATM model E) may still be utilized to process portions of the jobs without inflating the processing fees charged to the job submitting entity.

As discussed previously, in other embodiments, the coordination server application may determine separate totals of the actual duration times 222 for each of the five models of ATMs used to process the job. Such duration time totals for each ATM model may then be normalized responsive to the normalizing factors 204 prior to being summed for determining the total normalized ATM hours for the job In other embodiments, other methods of compensating for the differences in processing ability between different models or types of ATMs may be used. For example, different processing fee rates for each type of model may be used to calculate the total processing fee. Such different processing fee rates may be calculated based on the sample task duration times 200 and/or the normalizing data 204 determined for the different ATM models 202. For example the processing fee rate for the use of model B ATMs may be set at half the processing fee rate for model C ATMs because the processing speed of model B ATMs is determined by the coordination server application to be half the speed of the model C ATMs. The different processing fee rates may than be used to calculate separate processing fees for each model of ATM used to process portions of the job. As discussed previously, the exemplary coordination server application may derive separate duration time totals for each model of ATM. These separate duration time totals for each ATM model may then be multiplied by their respective processing fee rates to determine processing fees for each portion of the job processed by the various models of ATMs.

Before submitting a processing job, job submitting entities may wish to have an estimate of the number of ATM hours and/or processing fees that may be associated with the processing of a job. As the costs associated with all the individual tasks that make up a job may not be readily calculated prior to processing a job, the exemplary coordination server application 54 may be operative to generate estimates of the amount of processing time and fees that will be required to complete a submitted processing job.

As discussed previously with respect to calculating the relative speed of different models of ATMs, the exemplary coordination server application may be operative to submit to one or more ATMs, a small subset of one or more test tasks selected from the many tasks that comprise the processing job. These test tasks may also be used to estimate an amount of processing time or ATM hours required to perform the job. Based on this estimate of ATM hours, the exemplary coordination server application may be operative to estimate the total amount of processing time and costs required to complete the processing job. This estimate may be forwarded to the submitting entity by the coordination server application 54 for evaluation prior to purchasing access to the exemplary system for processing a proposed job.

In further exemplary embodiments, the coordination server application may be operative to select which ATMs to send the tasks based on the bandwidth requirements of the tasks. For example, tasks which are comprised of a large number of bytes or produce task results with a large number of bytes may only be allocated to those ATMs which have a relatively fast network connection to the coordination server application such as a DSL, T1, or high bandwidth leased connection. Tasks associated with a relatively small number of bytes which must be transferred between the ATM and the coordination server application, may be allocated to those ATMs which have a relatively slower network connection such as a dial-up phone line. The coordination server application may also charge different processing fee rates for different sets of ATMs based on the relative speed of the network connection of the sets of ATM.

It is to be understood that exemplary embodiments of the system may be used to process other types of jobs that may be divided into a plurality of tasks. Other examples of processing jobs may include processing a spectrum of measured signal data, where each task includes the numerical processing of individual segments of band width of the signal data. Other processing jobs may include calculating data using a specified function, wherein each task includes a different set of arguments to the function. Further, other jobs may involve finite elemental analysis calculations and modeling with each task corresponding to different sets of constraints. Other exemplary embodiments may include cryptography calculations such as unencrypting data, where each tasks corresponds to one or more different keys which are used to attempt to decipher the data.

In further exemplary embodiments, the coordination server application may be operative to generate additional tasks based on the results of processed tasks. For example a job may include a multi-step process calculation. As a result a first set of ATMs may be given tasks for processing a first portion of the calculation. The results of those tasks may be organized into new tasks by the coordination server application and submitted back to the first set of ATMs or to a second set of ATMs to calculate a second portion of the calculations. The exemplary coordination server application may be operative to manage multiple iterative and/or recursive calculations of a processing job by routing tasks and the results of tasks among a plurality of ATMs for processing.

In further exemplary embodiments, the ATMs may be operative to forward tasks and results of tasks to other ATMs through a peer to peer network configuration. ATMs may spawn off one or more tasks to one or more other ATMs directly rather then requiring the coordination server application to manage the distribution of all tasks to ATMs. The ATMs may also be operative to pass messages, task results, and/or processing components between themselves to facilitate processing tasks.

In further exemplary embodiments, individual ATMs may be operative to receive processing jobs from users through the input devices of the ATM terminals. The processing jobs may be forwarded to the coordination server application by the ATM. The coordination server application may then divide the job into a plurality of tasks and distribute those tasks to a plurality of ATMs to process. As discussed preciously the results of the tasks may be returned to the coordination server application and forwarded to an e-mail address or other network accessible address supplied by the user that originally submitted the job through an ATM.

In addition the coordination server application may store the results in a data store. When the user wants to review the job results he may return to the original or another ATM. The ATM may enable the user to submit a command or request message through operation of the ATM which is operative to cause the job results to be retrieved from the data store and be forwarded to the ATM by the coordination server application. The ATM may then be operative to output the job results for the user through the display device of the ATM or a printer. In addition, as schematically shown in FIG. 3, the ATM may include a separate portable storage medium drive 154 that is operative to read and/or write information to a portable storage medium. In other exemplary embodiments, the card reader 26 may function as a portable storage medium drive that is capable of reading and writing information related to processing jobs from a smart card or other memory card which is operate to store information. Such card reader may be operative to read financial account information from a financial account card, retrieve processing jobs from the smart card and save processing job results back to the smart card.

In other exemplary embodiments the ATM may include other types of portable storage medium drives 154 such as an Iomega Jaz® drive; magneto optical drives such as an Iomega Zip® drive; flash memory drives for writing to flash memory devices such as CompactFlash and Sony Memory Stick®; PC Card Interfaces; CD drives, DVD drives; Mini-CD drives; and digital tape drives. The exemplary embodiment of the ATM may also include a wired or wireless communication port 156 that is operative to communication with a portable computing device such as a mobile phone, notebook computer, or a PDA. The ATM through operation of the communication port may be operative to receive processing jobs and send the results of the processing jobs to the portable computing devices.

In other embodiments, the user may access any of the plurality of ATMs in operative connection with the coordination server application to retrieve the job results from the coordination server application. In a further exemplary embodiment, the coordination server application may be operative to provide access to the job results through an HTTP server such as an Internet web server which is in operative connection with the coordination server application and/or data store. Users may than log into the web server to retrieve the processing job results stored in the data store by the coordination server application.

The processing fees used to pay for processing the job may be collected from the user through operation of the ATM. For example, the ATM may prompt the user to insert a credit card, debit card, checking account card, or other financial account card into a card reader of the ATM. The ATM may cause the card reader to retrieve the necessary account information from the card for purposes of assessing processing fees to the financial accounts associated with the cards. In an exemplary embodiment, the ATM may be operative to assess processing fees to a financial account of the user through communication with a financial transaction processing computer or system which is operative to carry out financial transfers and authorizations.

The processing fees may be charged either before or after the processing job has been completed. As discussed previously, the processing fees may be determined prior to the completion of the job, by processing portions of the job to determine an estimate of the amount of processing time the entire job will require. Such processing fees charged to the user's financial account may then be based on the estimate for the processing time to complete the job. In other exemplary embodiments, the processing fees may be based on a flat rate or other rate responsive to the type of the processing job and/or the processing parameters selected by the user. For example ATMs may be operative to output through a display device a menu which lists a plurality of different types of processing jobs. One or more of the different types of processing jobs may then be selected by the user through operation of the input devices of the ATM. Parameters for performing the selected type of processing job may then be inputted through the input devices of the ATM and/or be retrieved from a portable storage medium or a portable computing device of the user. The fees charged to the user's financial account may be based on the selected type of processing job and/or the inputted parameters used in processing the job.

For example, the user may wish to perform data mining on one or more databases. An exemplary embodiment of the ATM may be operative to output one or more menu screens that include a listing of different databases that are available for data mining through the ATM. Databases for example, may include census data, genome sequencing data, financial data, or any other large database of information which users may find useful for data mining processing.

The ATM may further provide one or more screens that prompt the user to provide parameters to be used in performing the data mining processing in the selected database. Examples of parameters used in data mining processing and other processing jobs may include individual parameters such as date ranges and geographical regions. The processing fees charged to the user's financial account by the ATM may be based on the particular database selected and/or the type of parameters selected. For example, processing fees involving database mining through a database of census data may cost less for a parameter associated with an individual state compared to a parameter associated with all of the United States.

To provide more complex parameters involved with the data mining, the ATM may be operative to retrieve the parameters from a portable storage medium or portable computing device of a user. Examples of other more complex parameters may include expert system evaluation trees, statistical algorithms, or other data, which may be used to analyze or process data in the selected database. In other exemplary embodiments, the ATM may be operative to retrieve from a portable storage medium of the user, a plurality of different types of processing components, databases, images, or other objects may be used by the coordination server application, and/or ATMs to process the requested job.

Examples of other processing jobs that may be initiated through an ATM or through the coordination server application, may include searches for individuals using the ATMs. For example, as shown in FIG. 1, an ATM may include a camera 15 that is operative to capture image data of the person operating the ATM. The image data captured by the camera of the ATM may include images in the form of video frames and individual image files. The captured ATM image data may be processed by an exemplary embodiment of the system for use with identifying or finding people.

Figure 6:
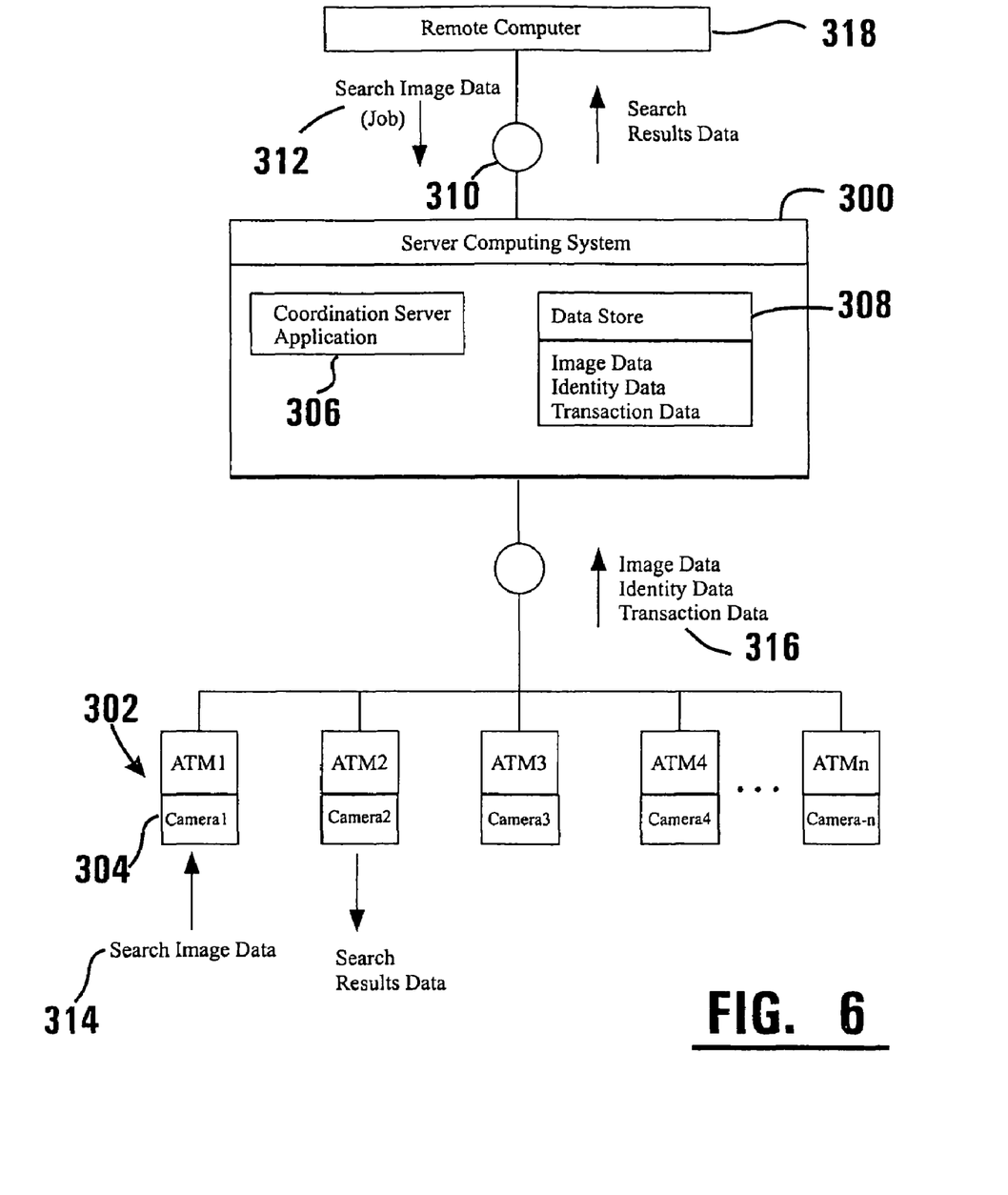
FIG. 6 is a schematic view of an exemplary embodiment of an ATM processing system that is operative to search for users of ATMs.

As shown in FIG. 6, an exemplary server 300 is in operative connection with a plurality of ATMs 302. The server 300 may include the previously described coordination server application 306, and a data store 308. Each of the ATMs 302 may include a camera 304 which is operative to capture image data of the users operating the ATMs. In an exemplary embodiment the ATMs 302 may be operative to send one or more captured ATM image files or video frames of the user to the coordination server application 306 or some other server application of the server 300 for storage in the data store. Such ATM image data may be stored in association with transaction data associated with the operation of the ATM by the user. Such transaction data may include the location of the ATM where the image data was captured and the date and time the image data was captured. In addition the transaction data may include the account numbers associated with the card or cards used to access the machine and the types of transactions performed at the ATM. The transaction data may further include information about the financial accounts associated with the account numbers, such as the names and addresses of the account holders.

Job submitting entities such as law enforcement individuals or other individuals may submit processing jobs 312, 314 through one of the ATMs 302 or through a public network such as the Internet 310 to the coordination server application 306. Such processing jobs may include one or more images of people to search for from among the people pictured in the captured ATM images. Searches may involve comparing the received search image data showing a known or suspected criminal or terrorist to the image data captured by the ATMs. The tasks involved with the processing job may correspond to performing imaging processing functions on the ATM image data which are operative to quantify characteristics of the users shown in the ATM image data.

In an exemplary embodiment, the coordination server application 306 may divide the image processing of the ATM images data among the plurality of ATMs 304. As a result each ATM would receive copies of one or more of the previously captured ATM image files from the data store 308 and a copy of one or more search image files from the submitted processing job. Each individual ATM may then perform image analysis calculations on the ATM image data and search image data to determine if the individuals shown in the ATM and search image data are similar. Task results 316 returned to the coordination server application 306 by the ATMs 302 may include data which indicates a level of correlation or similarity between the person shown in the ATM image data and the person shown in the search image data. The results of the precessing job may include a listing of matching image files captured by the ATMs and portions of the associated transaction data such as the date and time the image was captured, the location of the ATM, the financial accounts accessed, and the account holder name associated with the financial accounts accessed.

In another exemplary embodiment, the ATMs 302 may be operative to process the ATM image data prior to forwarding the ATM image data to the coordination server application 306 for storage in the data store 308. Such processing may include determining identity data from the ATM image data.

The ATM identity data may quantify identifying features of the person depicted in the ATM image data such as hair color, facial hair, baldness, eye color, skin color, height, scars, and facial measurements. Facial measurements, for example, may include measurements related to features of the individuals face such as the relative positions and distances between the eyes, nose, mouth, neck, ears, and hairline of the individual. These measurements or other identifying data determined from the image data may be submitted to the coordination server application 306 for storage in the data store 308 along with the associated ATM image data and the associated transaction data.

When a processing job is received related to searching through the ATM image data for a particular person, the coordination server application 306 may search through the data store 308 and select only those ATM image files and transaction data from the data store 308 that are associated with similar identity data as the person being searched for. Because the ATM image data has been previously processed, the coordination server application can quickly select one or more records from the data store 308 which include ATM identity data with features and measurements that correspond to the features and measurements of the identity data of the person being searched for.

For example, a job submitting entity such as a police officer may submit a processing job that corresponds to a search for a person. The processing job may include search image data such as an image file of the person which is uploaded to the coordination server application 306. The coordination server may then process the uploaded image of the person to determine corresponding search identity data associated with the person being searched for. The search identity data from the search image data may then be compared to the plurality of records in the data store which include ATM identity data corresponding to users of ATMs. Matching ATM image data and associated transaction data may then be returned to the police officer or other job submitting entity for further analysis.

In further exemplary embodiments, the coordination server may accept search identity data directly from the job submitting entity which corresponds to the person being searched for. In other exemplary embodiments, the coordination server may accept both search image data and additional search identity data corresponding to the person. For example the submitted search image data may include a black and white image file. The job submitting entity may also submit search identity data with the search image data which describes features that can not be determined from the black and white image such as eye and hair color of the person shown in the black and white image file.

In one exemplary embodiment the search image data may be received by the coordination server application from a remote client computer 318. Such a remote client computer may be in communication with the coordination server application 306 through an Internet web server or through e-mail for example. In another exemplary embodiment, the search image data may be uploaded to the coordination server application through operation of one of the ATMs 302. As discussed previously, an exemplary ATM may include a portable storage medium drive. The ATM may retrieve search image data such as a search image file from a portable medium placed in operative connection with the portable storage medium drive. In other exemplary embodiments the ATM may retrieve the search image file from a portable computing device placed in operative connection with the ATM by the user. In other exemplary embodiments, the ATM may include a scanning device which is capable of capturing a search image file from a physical photograph.

When the coordination server application has completed searching the data store 308 of captured ATM images which match the submitted search image, the job submitting entity may send a request message to the coordination server which is representative of a request to return the results of the search. In response, the coordination server may return search results data which includes the results of the search. Such results may includes information about the determinations made by the coordination server when performing the search. Such determinations may include a listing of those captured images which most closely match the search image. The determinations may further include a ranking of the matching ATM image data which is based on the relative similarity between the ATM image data and the search image data. Such a ranking for example may be based on the percentage of identity data of the captured images which corresponds to the search identity data of the search image. In addition the search results data may include one or more ATM image files or video frames and at least portions of the transaction data associated with the ATM image data.

In an exemplary embodiment, the search results data may be retrieved from the coordination server by accessing one of the ATMs 302. Exemplary embodiments of the ATMs may enable a user to send a request message to the coordination server which corresponds to a request to send the search result data to the requesting ATM. In an exemplary embodiment, the ATM may output the images and associated transaction data through an output device of the ATM such as a printer or display screen. Also the exemplary embodiment of the ATM may save the search results to a portable storage medium or to a portable computing device of the user.

In other exemplary embodiments, search results data may be sent by the coordination server application to an e-mail address or other network accessible address specified by the user when the search image data was submitted to the coordination server. In further exemplary embodiments, the coordination server may be in operative connection with an HTTP server which is operative to send the search results as part of a web page to a browser of a remote computer.

In an exemplary embodiment, the ATM image data may be processed by the ATMs to determine ATM identity data prior to uploading to the coordination server. In other exemplary embodiments the coordination server may process the ATM image data to determine the ATM identity data. In further exemplary embodiments, the processing of the ATM image data may be performed by both the coordination server and the ATM. In addition, in further exemplary embodiments, the coordination server may allocate to a plurality of the ATMs, tasks which include ATM image data to process. The task results returned to the coordination server may include ATM identity data determined from the captured ATM images.

In this described exemplary embodiment, the search image data does not correspond to a user who is authorized to perform transaction functions at an ATM. In addition the search image data does not originate from a camera of an ATM and does not correspond to a person who is being searched for from among ATM image data to determine if the person is authorized to perform transaction functions at an ATM. Also, authorizations of transactions at ATMs are not performed responsive to matches between captured ATM image data of the user and search image data. Rather transactions by a user at exemplary embodiments of the ATMs are authorized without reference to the search image data. Such transactions for example may be authorized by the user entering a PIN number or a biometric data which is validated by the system independently of the search image data. In the exemplary embodiment, the search image data is not used by the system to validate or authorize transactions at ATMs by users.

In a further exemplary embodiment, a processing job may correspond to an ongoing search for one or more particular individuals that use an ATM in the future. For example, a processing job may include search image data such as an image file and/or identifying features of a person to search for. However rather than or in addition to searching through a pre-existing data store of ATM image data, the coordination server application may continually monitor all newly captured ATM image data and/or ATM identity data determined from the newly captured ATM image data for matches with the person being searched for as part of the processing job. Thus for example, if a governmental entity such as a law enforcement entity is searching for a suspected terrorist or a missing person, the search image data showing the person and/or search identity data associated with the person may be continually compared to all or a subset of the newly captured ATM image data or determined ATM identity data. When a match is found between ATM image data of a user operating an ATM and the search image data of the person being searched for, the exemplary coordination server application may be operative to send the search results data in the form of an alert or warning message to an address associated with the search. Such an address for example may be an e-mail message or other communication address of the entity that submitted the search. The alert message may include captured ATM image files or video and the date, time and location of the ATM where the ATM image was captured. The alert message may further include the name of the account holder or other transaction data associated with the financial account being used by the person at the ATM.

In exemplary embodiments, the processing job may include parameters to be used when performing the search of ATM image data. Such parameters may limit the search to ATM image data from a specific geographical location and/or time period. Such parameters may further specify which of a plurality of determined ATM identify data to limit the search. For example, ATM image data may be processed to determine ATM identity data such as hair color, facial hair, baldness, eye color, skin color, height, scars, and facial measurements. The parameters included in a processing job may limit which identity features are evaluated or may assign weighing factors as to which identity features are more or less important when calculating whether ATM image data should be considered a match by the system.

In addition to performing image analysis on image data captured from users of ATMs, exemplary embodiments the system may further process other types of images or other types of data captured from ATMs. For example, the depository mechanisms of ATMs may include cameras or other sensors which are operative to capture image data or other measurable data from items deposited into the ATM. Such items may include monetary instruments such as checks, currency, coins, or other items which are deposited into an ATM. The ATM which receives the deposited item may itself process the captured image data or other measurable data by the ATM. In addition the ATM may uploaded the image data or other measurable data to a remote server for processing by the remote server or other ATMs.

The processes performed on such image data or other measurable data may include handwriting analysis such as cursive signature analysis of the signatures written on checks deposited with the ATM. Processes may also include analysis of deposited monetary instruments such as cash for indications whether the item is a forgery.

As discussed previously, such processes may be performed while the ATM is generally idle and is not being used to perform consumer transaction functions. The results of the processing may then be uploaded to a remote server application such as the previously described coordination server application for storage in one or more data stores and for routing to other computer systems.

Thus the new ATM processing system and method achieves at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method comprising:
(a) receiving a processing job through operation of at least one computer, wherein the processing job includes search image data related to a person, wherein the processing job corresponds to searching for at least one user of an automated banking machine which corresponds to the person, wherein the automated banking machine includes a card reader and is operative to carry out financial transactions for users of the automated banking machine;
(b) capturing first image data corresponding to a first user operating a first automated banking machine through operation of a camera, wherein the first image data is associated with first transaction data corresponding to operation of the first automated banking machine by the first user;
(c) authorizing through operation of the at least one computer at least one financial transaction by the first user at the first automated banking machine independent of the search image data, wherein the first transaction data corresponds to the at least one financial transaction;
(d) comparing through operation of the at least one computer, the first image data and the search image data;
(e) determining through operation of the at least one computer that the user depicted in the first image data is visually similar to the person depicted in the search image data; and
(f) generating search results data through operation of the at least one computer responsive to the determination in step (e), wherein the search results data includes at least a portion of the first transaction data.

2. The method according to claim 1, wherein in step (f) the search results data further includes at least a portion of the first image data.

3. The method according to claim 2, wherein in step (f) the search results data are generated through operation of at least one server, and further comprising:
(g) operating the at least one server to provide access to the search results data by at least one further computer located remotely from the at least one server.

4. The method according to claim 3, wherein in step (g) the at least one server includes an HTTP server that is operative to transfer the search results data to the at least one further computer.

5. The method according to claim 2, wherein the at least one computer includes a server, and wherein in step (f) the search results data are generated by the server, wherein further comprising:
(g) retrieving the search results data from the server through operation of a second automated banking machine.

6. The method according to claim 5, wherein further comprising:
(h) outputting indicia corresponding to the search results data through an output device of the second automated banking machine.

7. The method according to claim 5, and prior to step (f) further comprising:
(h) capturing second image data corresponding to a second user operating the second automated banking machine through operation of a camera, wherein the second image data is associated with second transaction data corresponding to the operation of the second automated banking machine by the second user;
(i) comparing through operation of the at least one computer the second image data and the search image data;
(j) determining through operation of the at least one computer that the user depicted in the second image data is visually similar to the person depicted in the search image data; and
wherein in step (h) the search results data further includes at least a portion of the second transaction data.

8. The method according to claim 7, wherein prior to step (f) further comprising:
(k) operating the at least one computer to assign a first ranking to the first image data and a second ranking to the second image data responsive to the relative similarities between the search image data and the first and second image data;
wherein in step (f) the search results data further includes the first and second rankings, and the first image data and the second image data are listed in an order that corresponds to the first and second rankings.

9. The method according to claim 1, wherein in step (f) the portion of the first transaction data includes at least one of: information representative of a date and a time of the operation of the first automated banking machine by the first user; information representative of at least one financial account associated with the operation of the first automated banking machine by the first user; information corresponding to at least one account holder name associated with the at least one financial account; and information representative of a location of the first automated banking machine.

10. The method according to claim 1, wherein step (d) is carried out through operation of at least one computer in the first automated banking machine, wherein the first automated banking machine includes a cash dispenser.

11. A method comprising:
(a) acquiring through operation of at least one computer from a plurality of automated banking machines, wherein each automated banking machine includes a card reader and is operative to carry out financial transactions, image data depicting users using the plurality of automated banking machines, wherein the image data for each user depicted in the image data is associated with transaction data corresponding to the use of the respective automated banking machine by the respective user, wherein at least one of the automated banking machines includes a cash dispenser;
(b) receiving through operation of the at least one computer search image data depicting a person being searched for, wherein the search image data did not originate from a camera associated with any of the plurality of automated banking machines;
(c) identifying through operation of the at least one computer at least one user depicted in the image data that is visually similar to the person depicted in the search image data; and
(d) generating search results data through operation of the at least one computer which includes both the image data and at least a portion of the transaction data associated with at least one user identified in step (c).

12. The method according to claim 11, and further comprising:
(e) processing the image data through operation of the at least one computer to determine user identity data associated with each of the users;
(f) storing through operation of at least one computer in at least one data store the image data, the user identity data, and the transaction data;
(g) processing through operation of the at least one computer the search image data to determine search identity data associated with the person being searched for; and
wherein step (c) includes searching the at least one data store for at least one user for which at least a portion of the user identity data associated with the at least one user corresponds to the search identity data.

13. The method according to claim 12, and further comprising:
(h) prior to step (f), transferring the image data from each of the plurality of automated banking machines, to at least one server,
wherein in step (f) the at least one server is operative to store the image data, the user identity data, and the transaction data in the at least one data store.

14. The method according to claim 11, wherein the at least one computer operative to carry out step (c) is included in at least one of the automated banking machines.

* * * * *